US008370912B2

(12) United States Patent
Turnbull et al.

(10) Patent No.: US 8,370,912 B2
(45) Date of Patent: Feb. 5, 2013

(54) AUTOMATED USER REGISTRATION

(75) Inventors: Rory S Turnbull, Ipswich (GB); Stephen M Thompson, Bury St Edmunds (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 653 days.

(21) Appl. No.: 12/278,877

(22) PCT Filed: Jan. 11, 2007

(86) PCT No.: PCT/GB2007/000079
§ 371 (c)(1),
(2), (4) Date: Aug. 8, 2008

(87) PCT Pub. No.: WO2007/091012
PCT Pub. Date: Aug. 16, 2007

(65) Prior Publication Data
US 2008/0320573 A1    Dec. 25, 2008

(30) Foreign Application Priority Data

Feb. 8, 2006 (EP) .................................. 06250663

(51) Int. Cl.
*H04L 29/06* (2006.01)
(52) U.S. Cl. .......................................... 726/7; 713/168
(58) Field of Classification Search .................. None
See application file for complete search history.

(56) References Cited

U.S. PATENT DOCUMENTS 6,671,735 B1 * 12/2003 Bender .......................... 709/238
6,879,825 B1 * 4/2005 Daly ............................. 455/419
2002/0049580 A1   4/2002 Kutaragi et al.
2004/0082346 A1 * 4/2004 Skytt et al. ................. 455/456.3

FOREIGN PATENT DOCUMENTS

GB    2 395 644      5/2004
WO    2004/072832    8/2004

OTHER PUBLICATIONS

International Search Report for PCT/GB2007/000079, mailed Mar. 20, 2007.

* cited by examiner

*Primary Examiner* — Gilberto Barron, Jr.
*Assistant Examiner* — Izunna Okeke
(74) *Attorney, Agent, or Firm* — Nixon & Vanderhye P.C.

(57) ABSTRACT

For users to access network services such as video streaming from a device, users usually have to register themselves with the service first. Most registration mechanisms require a user to input a username, password, date of birth and other details. When implemented through a web interface, this mechanism is relatively easy for the service provider to provision. However, the problem is that users are required to manually enter significant amounts of information which can be both time consuming, especially on a mobile device where there usually no QWERTY input device, and susceptible to unintentional errors. The present invention proposes an automated registration process that does not require a user to enter any details manually except for the initial request to subscribe to a service. The process gathers information automatically about the user and the device used, which is then stored and used for user authentication during subsequent service requests following the initial subscription request. The subsequent requests for service also do not require the user to manually input any user data.

17 Claims, 3 Drawing Sheets

AUTOMATED USER REGISTRATION

This application is the U.S. national phase of International Application No. PCT/GB2007/000079, filed 11 Jan. 2007, which designated the U.S. and claims priority to filed Europe Application No. 06250663.9, filed 8 Feb. 2006, the entire contents of each of which are hereby incorporated by reference.

FIELD OF THE INVENTION

This invention relates to a method of registering for a service between a user terminal and an application server, in particular a simplified method of registering for a service comprising a registration phase followed by a subsequent request for service phase.

BACKGROUND TO THE INVENTION

Mobile phones are commonplace today and they provide users with ever more sophisticated features and services, for example services such as music downloads and video streaming. For users to access network services such as video streaming, users often have to first register themselves with the service. The registration process not only allows the service provider to authenticate the user, but also enables the service provider to bill the user for the service.

Common methods of user registration involve the user entering various credentials such as a username, a password, date of birth and so on, which are stored by the service provider. When the user subsequently wishes to access a service from the service provider, the user enters his username, password and perhaps some other previously registered details, which are checked against the details held by the service provider. As already suggested, the mechanism for registration is especially important when the user is registering for a service that requires some sort of payment by the user to access the service, a so called pay service such as downloading or streaming video. The service provider should only grant access to a pay service when a suitable level of authentication is achieved. Furthermore, the service provider needs to be confident that the user requesting the service is the person they say they are and that they have the ability to pay e.g. service provider has verified credit card details during registration or can use reverse SMS to take payment.

The registration mechanism using username and password is often implemented through a web interface and is relatively easy for the service provider to provision. However, the problem is that users are required to manually enter significant amounts of information which can be both time consuming, especially on a mobile device where there usually no QWERTY input device, and susceptible to unintentional errors. This is even more troublesome if credit card details need to be provided.

SUMMARY OF THE INVENTION

It is the aim of embodiments of the present invention to address one or more of the above-stated problems, thereby providing a simplified method for user registration and service provisioning.

According to one aspect of the present invention, there is provided a method of registering for a service in a communications network between a user terminal and an application server, said method comprising the steps of:

(i) receiving a subscription request for the service at the application server, said subscription request including a subscriber identity associated with the user terminal;
(ii) initiating a configuration dialogue between the application server and the user terminal to configure an application on the user terminal, wherein the application server sends an identity number to the user terminal;
(iii) storing at the user terminal the identity number and sending from the user terminal to the application server the identity number and a serial number associated with the user terminal;
(iv) storing at the application server the serial number with the corresponding identity number sent by the user equipment;
(v) sending a request for the service from the user terminal to the application server using the configured application, said service request including the identity number and the serial number stored at the user equipment;
(vi) comparing by the application server the identity number and serial number sent by the user equipment and comparing said numbers with the corresponding numbers stored at the application server, and if the number match, then providing the requested service to the user equipment.

A subscriber can therefore request subscription to a service, such as a video streaming service, by simply sending a simple SMS message to the application server using his mobile phone or via a web portal using a PC.

The method is simple to use for the subscriber, who only needs to input a limited amount of information to register, such as the massage or registration via a web portal. As such the subscriber will be encouraged to use the service, which might otherwise be off putting due to its technical complexity.

Subscribers are also not asked to disclose any personal information e.g. email address, date of birth etc, which could be used for marketing approaches by the service provider. Such reassurances are also looked upon favourably by potential subscribers.

The identity number in the method may be a random number generated by the application server or the subscriber identity. The subscriber identity may be a mobile subscriber ISDN number.

The serial number may be the international mobile equipment identity of the user terminal.

As collection of subscriber credentials is automatic, in the sense that the subscriber does not need to manually enter any data, the process if faster, more efficient, and less prone to subscriber error than in previous registration methods. Furthermore, the automatic collection of credentials makes the method less prone to a fraudulent subscriber attempting to use another subscriber's identity.

Preferably, the subscription request is sent by the user terminal over the communications network. The subscription request may be in the form of a short message service message.

Preferably, the subscriber identity is added by the communications network to the subscription request. Preferably, the communications network is a mobile communications network.

Alternatively, the subscription request is sent over the Internet from a PC via a web page.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

In examples of the present invention, there is proposed an automated registration process that does not require a subscriber to enter any details except for the initial request to subscribe to a service. The process gathers information automatically, which is then used for subscriber authentication during subsequent service requests following the subscription request. The information gathered can also be used for billing of the service.

Figure 1:
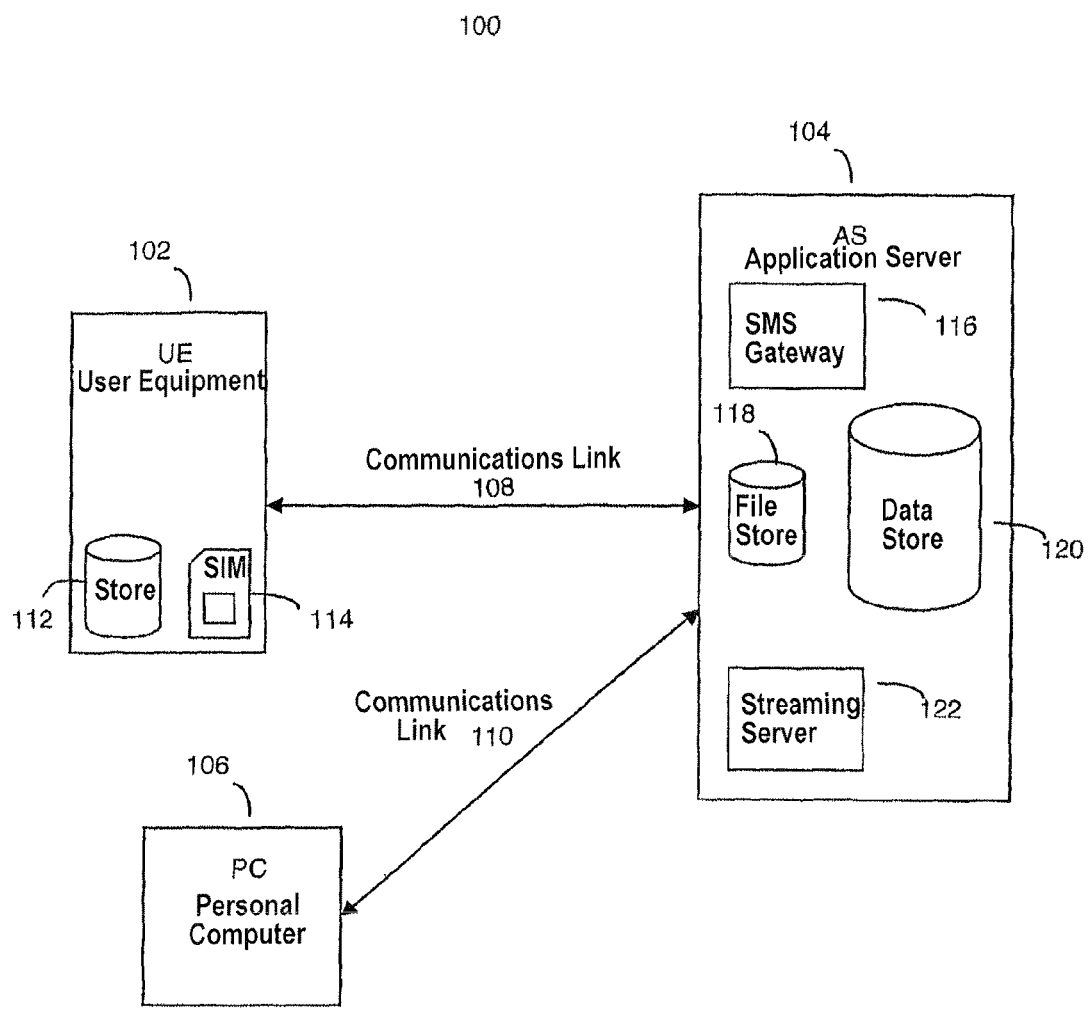
FIG. 1 is a network diagram in an example of the resent invention.

FIG. 1 illustrates a network 100 comprising a user equipment 102, such as a mobile phone, an application server 104 and a personal computer 106. The user equipment 102 can communicate with the application server 104 over communications link 108, which may be over a GSM, UMTS or other cellular mobile network. For simplicity, individual components of the cellular mobile network have been omitted. The personal computer 106 can communicate with the application server over communications link 110, which may be an internet connection for example.

The user equipment 102 includes a data store 112, which can be used to store data such as phone numbers, photos and videos, as well as applications such as a video player. The user terminal also includes a subscriber identity module (SIM) 114, which holds subscriber information, such as the international subscriber identity (IMSI) which uniquely identifies the subscriber/user to the network. The user equipment 102 also has an associated international mobile equipment identity (IMEI), which is akin to a serial number for the device.

The application server 104 includes a short message service (SMS) gateway 116, a file store 118, a data store 120 and a streaming server 122. The SMS gateway 116 is able to receive and process SMS messages sent to the application server 104. The file store 118 can store application files such as video streaming applications, the data store 120 can be used to store information associated with subscribers and user terminals. The streaming server 122 provides streaming services such as video streaming upon request from and to the user equipment 102.

The specific operation of the elements in FIG. 1 will be described in more detail below with reference to the message flow diagram of FIG. 2, with references to the elements found in FIG. 1 made using like reference numerals.

Figure 2:
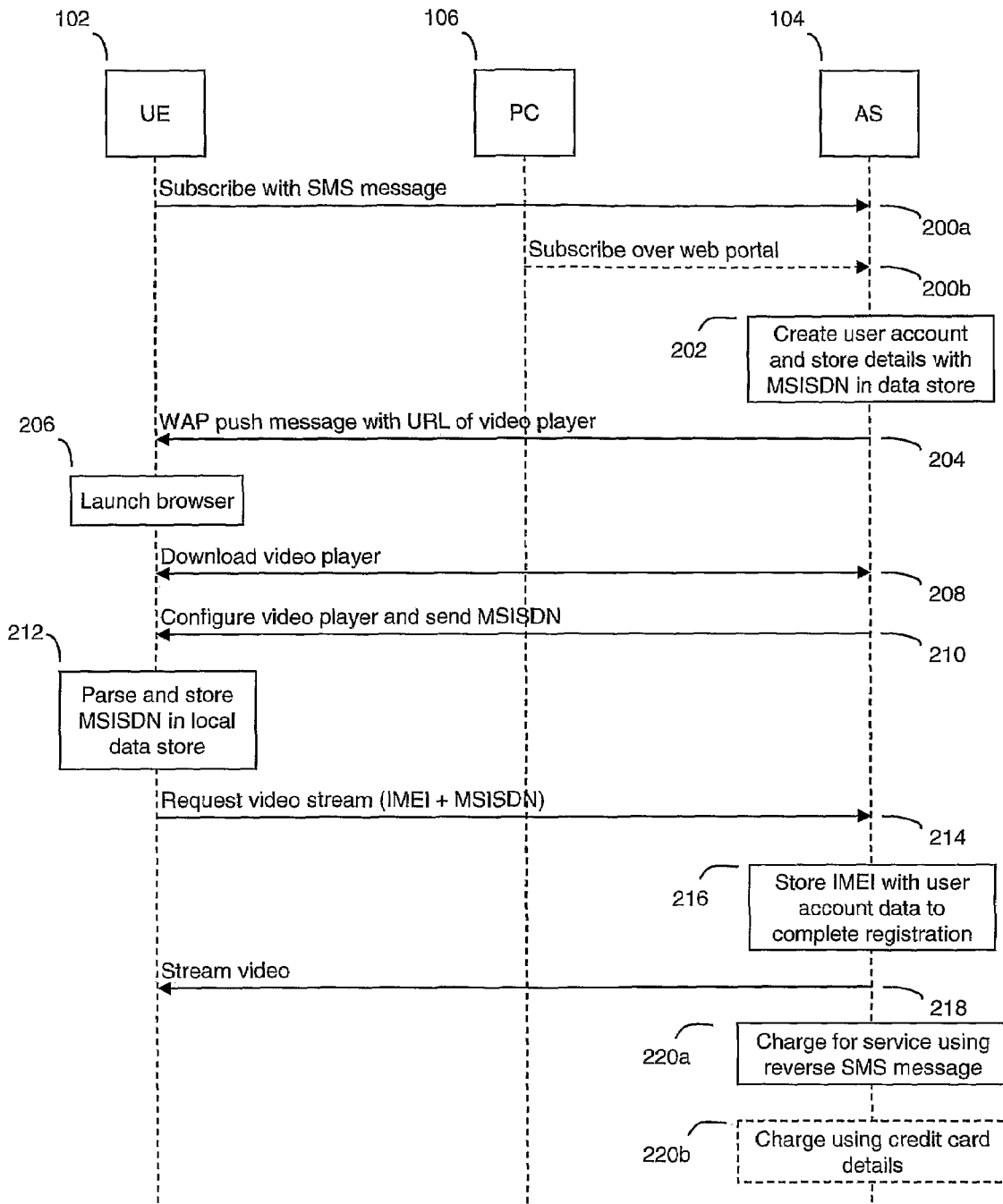
FIG. 2 is a message flow diagram illustrating a registration and authentication process in an example of the present invention.

FIG. 2 illustrates the process of a subscriber registering with a video streaming service from an application server using his mobile phone and then receiving the requested video stream.

The subscriber first requests a subscription to a video streaming service from the application server 104 using his user equipment 102, which may be a mobile phone. The request can be made by sending an SMS message from the user equipment 102 to a "short code" associated with the application server in step 200a. The message may simply read "service on" for example, where the "service" is the specific service name the user wishes to subscribe to. The user may also use the same method to unsubscribe to a service, for example by sending a "service off" text message to the short code. The message also includes the international subscriber identity (IMSI) which is stored on the SIM 114 and uniquely identifies the subscriber/user to the mobile network. The mobile network can identify the subscriber by the IMSI and can determine the corresponding telephone number associated with that subscriber. This telephone number is more commonly referred to as the mobile subscriber ISDN (MSISDN) number. Once the network determines the MSISDN for the subscriber, the MSISDN is added to the SMS message before it arrives at the application server 104.

The SMS message is received at the SMS gateway 116 in the application server 104. The application server 104 then parses the SMS message to obtain the MSISDN of the subscriber, the service to which the user is subscribing and whether the request is to subscribe or unsubscribe. The application server 104 uses this information to create a subscriber record in the data store 120 as shown in step 202. The subscriber record may include the MSISDN associated with the subscriber, a sequence number, the service for which a request has been made and an indication that the subscription request was made by SMS.

In another example of the present invention, the subscription request may be initiated from the personal computer 106. In this example, the user enters his details, including his MSISDN, via a web page. As shown in step 200b, this information can then be sent to the application server 104 over the internet. Once the application server 104 receives this information, it can create a subscriber record in the same was as for an SMS based subscription request above. The web page may also include requests for payment details such as credit card information so that the subscriber can be billed for the subsequent service accordingly. The request for payment information may be handled by a recognised third party payment broker such as WorldPay.

In step 204, the application server sends a wireless application protocol (WAP) push message to the user terminal 102, identified by the MSISDN. The WAP push message includes a universal resource locator (URL), identifying the portal, such as a WAP or XHTML portal, where the video player needed for the video streaming can be downloaded and the content selected.

The video player to be downloaded can include features that support more advanced video coding technology, such as H.264 as well as more advanced video streaming technology than is available from standard video players built into most devices. This allows for improved video quality that is less susceptible to network congestion and errors, and has faster start up times than most conventional players.

The user equipment 102 then launches a web browser automatically in response to the WAP push message in step 206, and is directed to the URL contained in the message. When the web browser makes the HTTP request to the application server 104, it passes over a string which describes the user equipment 102, such as the model number, and the MIME (multimedia internet mail extension) types recognised by the device in step 208 so that a suitable video player can be downloaded and optimised for the user equipment 102. The URL specified by the application server 104 in the WAP push message may correspond to a location in the file store 118.

The application server 104 parses the string from the user equipment 102 and decides if the video player needs to be downloaded, as the user equipment 102 may already have a video player downloaded that can support the video stream.

In response to the HTTP request, the user equipment 102 is presented with a series of introductory WML or XHTML pages that can be automatically scrolled through and inform the subscriber as to what will happen next. Depending on the decision the application server has made, a video player may be downloaded to the user equipment 102 at this point. This download starts automatically once all the WML or XHTML pages have scrolled through. Once downloaded, the subscriber is prompted to install the video player which is a semi-automatic process requiring the subscriber to simply accept the installation and confirm they are happy with the licence information that is presented to them as part of the installation process (in a similar way to installing applications on a PC).

In step 210, the application server sends a metafile to the user equipment 102, which tells the user equipment 102 where the video server/content can be located. The metafile also includes additional data used to configure the video player, such as the MSISDN associated with the subscriber stored at the application server 104 and instructing the video player to capture the IMEI of the user equipment 102. The MSISDN received by the user equipment 102 may be stored in the local data store 112.

The subscriber can now select using the video player on the user equipment 102 the video clip he wishes to stream. The video player processes the selection and sends it in a request to the application server in step 214. At the same time, the video player obtains the international mobile equipment identity (IMEI) associated with the user equipment 102 and sends the IMEI and the locally stored MSISDN together with the video streaming request. The IMEI can be considered as the serial number of the user equipment 102.

Alternatively, the request for a video clip can be requested without direct use of the video player, such as by using an electronic program guide. However, the request itself, no matter how it originates must include the locally stored MSISDN and the IMEI of the user equipment 102.

The streaming request is received at the streaming server 122 of the application server 104. The application server 104 parses the request and stores the IMEI of the user equipment 102 together with the subscriber record associated with the MSISDN in the data store 120. At this stage, the application server 104 may confirm that the registration process has been successful by sending a suitable acknowledgement message back to the user equipment 102.

Once registration is complete in step 216, the application server 104 can start streaming the requested video to the user equipment 102 in step 218.

In step 220a, the application server can use reverse SMS to charge the subscriber for the video stream. Alternatively, if the initial subscription request was made over the internet on the PC 106 (in step 200b), then the application server 106 can charge the subscriber using his credit card or other payment details provided during the subscription request.

Figure 3:
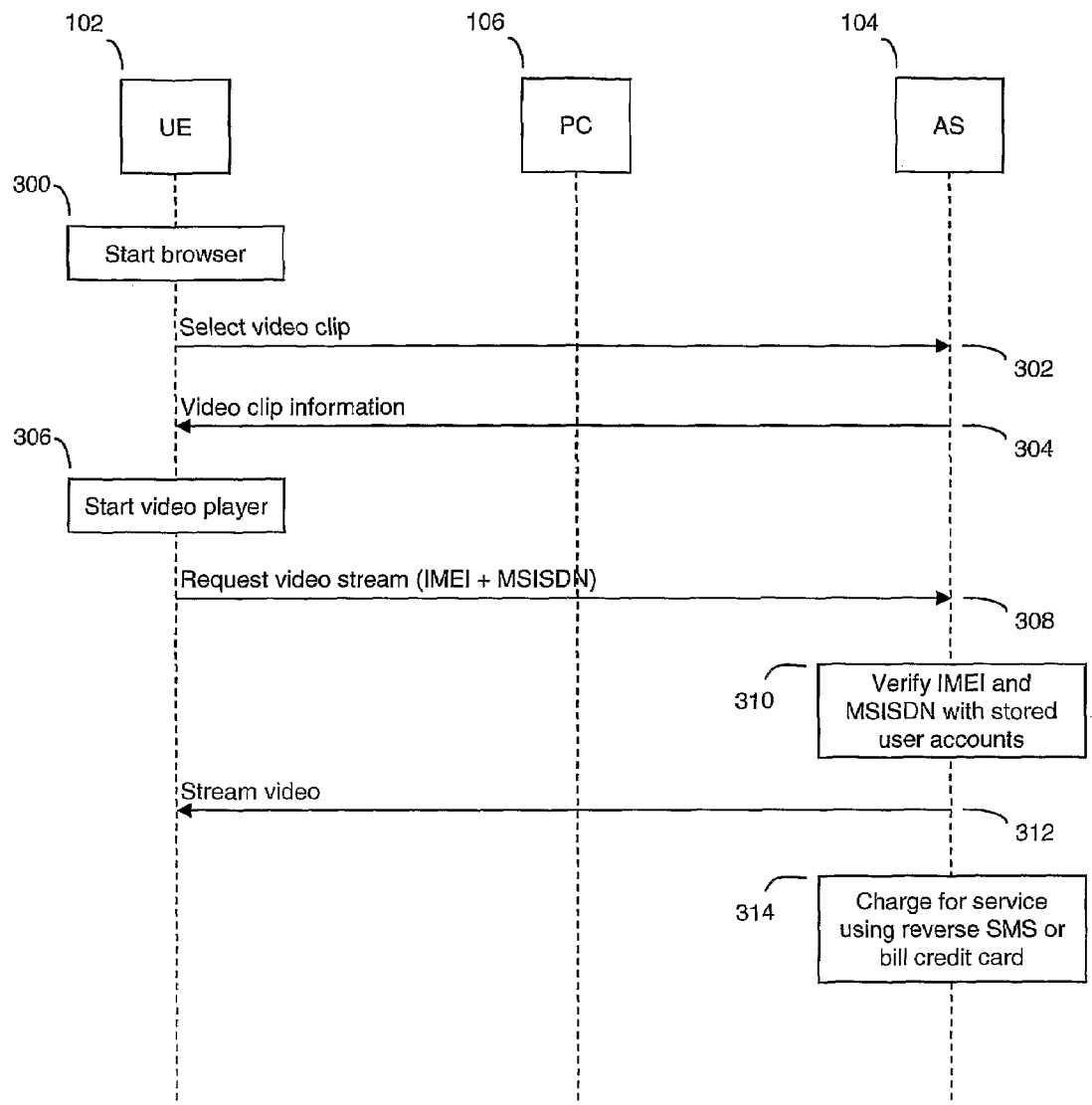
FIG. 3 is a message flow diagram illustrating a subsequent request for service in an example of the present invention.

FIG. 3 illustrates subsequent video streaming requests once the subscriber has completed the initial subscription request as outlined in FIG. 2.

In step 300, the subscriber opens a browser on the user equipment 102 and visits a web portal showing various files for streaming. Alternatively, the subscriber can use a suitable electronic programme guide to select the file. The subscriber then selects one of the files, which triggers a hyperlink to video meta data in step 302. In step 304, the user equipment 102 downloads the meta data where the MIME type associated with the meta data causes the previously downloaded video player to be launched in the user equipment (step 306). The meta data also tells the video player where the video clip can be found e.g. IP address/port of the file server.

In step 308, the video player automatically sends a request for the video stream to the location identified by the meta data. The request for a video stream includes the IMEI of the user equipment 102 and the MSISDN stored in the local data store 112.

In step 310, the request is received by the streaming server 122 of the application server 104. The streaming server checks to see if the received IMEI and MSISDN match those of a subscriber record stored in the data store 120. If the IMEI and the MSISDN match a subscriber record in the store, then the subscriber is authorised and the application server 104 begins streaming of the requested video in step 312 to the user equipment 102. If the IMEI and MSISDN sent by the user equipment 102 do not match a record in the application server's data store 120, then the subscriber is not authorised and the streaming request is rejected.

In step 314, charges for access to the service can be made by the application server 104 by sending a reverse charged SMS to the subscriber's user equipment 102, whose mobile account can be debited accordingly.

Following registration, if the SIM 114 was removed from the user equipment 102, either by the subscriber or dishonestly, and inserted into a different user equipment, the application server would reject the request for a video stream even if a compliant video player had already been set up. This is because the IMEI sent in the request for the video stream would not match that of the IMEI associated with the MSISDN of the subscriber record in the data store 120, where the MSISDN is tied to the IMSI stored on the SIM 114. (The IMEI associated with an MSISDN can only be changed by re-registering).

Therefore, the system only allows previously registered devices and their associated SIMs to make subsequent requests for a service, which in these examples are a video streaming service.

Furthermore, the authentication mechanism allows the system to be confident that when reverse SMS billing is used or post-pay credit card payments, the subscriber has already agreed to incurring charges. Or, when using pre-pay credit card payments, the system will know that the subscriber has already paid.

In another example of the invention, the application server 104 may generate and send a random number or sequence number (or username) to the user equipment 102 instead of the MSISDN of the user equipment in step 210. The application server stores this random number in the associated subscriber record in the data store 120. The system then works in exactly the same way as previously described, with the random number replacing the MSISDN. So, the user equipment 102 stores the received random number instead of the MSISDN and sends the random number instead of the MSISDN with the IMEI in the subsequent video streaming requests. The application server 104 uses the random number to validate the user by looking for the random number in a subscriber record in the data store 120, and stores the IMEI against this record. Any further streaming requests by the user equipment 102 will continue to use this random number together with the IMEI.

In order to use a generated random number, the application server 104 should ensure that the number is unique in so far as it has not been used for any earlier subscriber stored in the data store 120.

A skilled person will appreciate that the invention is not limited to a mobile phone making a request for service to the application server. In fact, it should be clear that the invention could also apply to any suitable device such a PDA or a laptop making a request for service to the application server.

Furthermore, whilst the examples of the invention describe a video streaming service, any other service requested by a user from an application server that requires simple authentication can utilise the same methods. For example, the examples are equally applicable to an audio streaming service such as for streaming music or for downloading ring tones.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of provisioning a service in a communications network between a user terminal and an application server, said method comprising an initial subscription request phase followed by a subsequent service request phase, the subscription request phase comprising:
    (i) receiving a subscription request for the service at the application server, said subscription request including a subscriber identity associated with the user terminal;
    (ii) initiating a configuration dialogue between the application server and the user terminal to configure an application on the user terminal, wherein the application server sends an identity number to the user terminal and the identity number is a random number generated by the application server;
    (iii) storing at the user terminal the identity number and sending from the user terminal to the application server the identity number and a serial number associated with the user terminal;
    (iv) in response to said sending the serial number with the corresponding identity number in step (iii), storing at the application server the serial number with the corresponding identity number sent by the user terminal in step (iii);
    and wherein the subsequent service request phase comprises:
    (v) sending a request for the service from the user terminal to the application server using the configured application, said service request including the identity number and the serial number stored at the user terminal;
    (vi) comparing by the application server the identity number and serial number sent by the user terminal from step (v) and comparing said numbers with the corresponding numbers stored at the application server, and if the number match, then providing the requested service to the user terminal.

2. A method according to claim 1, wherein the subscriber identity is a mobile subscriber ISDN number.

3. A method according to claim 1, wherein the serial number is the international mobile equipment identity of the user terminal.

4. A method according to claim 1, wherein the subscription request is sent by the user terminal over the communications network.

5. A method according to claim 4, wherein the subscription request is a short message service message.

6. A method according to claim 1, wherein the subscriber identity is added by the communications network to the subscription request.

7. A method according to claim 1, wherein the communications network is a mobile communications network.

8. A method according to claim 1, wherein the subscription request is sent over the Internet.

9. A method according to claim 8, wherein the subscription request is sent via a web page.

10. A user terminal configured to conduct communications with an application server of a communications network, the user terminal comprising:
    a storage device; and
    a processor configured to participate in an initial subscription request phase followed by a subsequent service request phase;
    wherein the processor, in order to participate in the initial subscription request phase, is configured to:
        send a subscription request for a service to the application server, said subscription request including a subscriber identity associated with the user terminal;
        participate in a configuration dialogue with the application server to configure an application on the user terminal, wherein the user terminal receives an identity number from the application server and the identity number is a random number generated by the application server;
        store in the storage device of the user terminal the identity number and send to the application server the identity number and a serial number associated with the user terminal for storage by the application server of the serial number with the corresponding identity number sent by the user terminal;
    wherein the processor, in order to participate in the subsequent service request phase, is configured to:
        send a request for the service to the application server using the configured application, said service request including the identity number and the serial number stored at the user terminal; and
        receive the requested service from the application server which compares the identity number and serial number sent by the user terminal and compares said numbers with the corresponding numbers stored at the application server, and provides the requested service to the user terminal if the number match.

11. The user terminal according to claim 10, wherein the subscriber identity is a mobile subscriber ISDN number.

12. The user terminal according to claim 10, wherein the serial number is the international mobile equipment identity of the user terminal.

13. The user terminal according to claim 10, wherein the subscriber identity is added by the communications network to the subscription request.

14. An application server for providing a service in a communications network to a user terminal, the application server comprising:
    a storage device; and
    a processor configured to participate in an initial subscription request phase followed by a subsequent service request phase;
    wherein the processor, in order to participate in the initial subscription request phase, is configured to:
        receive a subscription request for the service, said subscription request including a subscriber identity associated with the user terminal;
        participate in a configuration dialogue with the user terminal to configure an application on the user terminal, and send an identity number to the user terminal, wherein the identity number is a random number generated by the application server;
        receive the identity number and a serial number associated with the user terminal, the identity number being previously stored at the user terminal; and
        store, in the storage device of the application server, the serial number with the corresponding identity number received from the user terminal; and wherein the processor, in order to participate in the subsequent service request phase, is configured to:
  receive a request for the service from the user terminal using the configured application, said service request including the identity number and the serial number stored at the user terminal; and
  compare the identity number and serial number received from the user terminal, and compare said numbers with the corresponding numbers stored at the application server, and if the number match, then provide the requested service to the user terminal.

15. The application server according to claim 14, wherein the subscriber identity is a mobile subscriber ISDN number.

16. The application server according to claim 14, wherein the serial number is the international mobile equipment identity of the user terminal.

17. The application server according to claim 14, the subscriber identity is added by the communications network to the subscription request.

* * * * *

UNITED STATES PATENT AND TRADEMARK OFFICE
CERTIFICATE OF CORRECTION

PATENT NO. : 8,370,912 B2  Page 1 of 1
APPLICATION NO. : 12/278877
DATED : February 5, 2013
INVENTOR(S) : Turnbull et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 782 days.

Signed and Sealed this
First Day of September, 2015

Michelle K. Lee
*Director of the United States Patent and Trademark Office*